(12) United States Patent
Tremblay et al.

(10) Patent No.: US 7,664,942 B1
(45) Date of Patent: Feb. 16, 2010

(54) RECOVERING A SUBORDINATE STRAND FROM A BRANCH MISPREDICTION USING STATE INFORMATION FROM A PRIMARY STRAND

(75) Inventors: Marc Tremblay, Menlo Park, CA (US); Shailender Chaudhry, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 12/197,629

(22) Filed: Aug. 25, 2008

(51) Int. Cl.
*G06F 9/38* (2006.01)
(52) U.S. Cl. .................. 712/239; 712/207; 712/240
(58) Field of Classification Search ................ None
See application file for complete search history.

(56) References Cited

U.S. PATENT DOCUMENTS

| | | | |
|---|---|---|---|
| 7,114,059 B2 * | 9/2006 | Wilkerson | 712/217 |
| 7,343,602 B2 * | 3/2008 | Luk et al. | 718/100 |
| 7,490,229 B2 * | 2/2009 | Tremblay et al. | 712/239 |
| 2001/0037447 A1 * | 11/2001 | Mukherjee et al. | 712/239 |
| 2004/0128448 A1 * | 7/2004 | Stark et al. | 711/137 |
| 2006/0168432 A1 * | 7/2006 | Caprioli et al. | 712/235 |

* cited by examiner

*Primary Examiner*—Kenneth S Kim
(74) *Attorney, Agent, or Firm*—Park, Vaughan & Fleming; Anthony P. Jones (57) ABSTRACT

Embodiments of the present invention provide a system that executes program code in a processor. The system starts by executing the program code in a normal mode using a primary strand while concurrently executing the program code ahead of the primary strand using a subordinate strand in a scout mode. Upon resolving a branch using the subordinate strand, the system records a resolution for the branch in a speculative branch resolution table. Upon subsequently encountering the branch using the primary strand, the system uses the recorded resolution from the speculative branch resolution table to predict a resolution for the branch for the primary strand. Upon determining that the resolution of the branch was mispredicted for the primary strand, the system determines that the subordinate strand mispredicted the branch. The system then recovers the subordinate strand to the branch and restarts the subordinate strand executing the program code.

20 Claims, 4 Drawing Sheets

RECOVERING A SUBORDINATE STRAND FROM A BRANCH MISPREDICTION USING STATE INFORMATION FROM A PRIMARY STRAND

BACKGROUND

1. Field of the Invention

The present invention relates to techniques for improving the performance of computer systems. More specifically, the present invention relates to a method and an apparatus for using a primary strand to control a subordinate strand in a processor.

2. Related Art

Some processors support speculative execution, during which a processor can execute program code without committing the results to the architectural state of the processor (i.e., without making the results available to other strands, threads or processors). For example, some processors support a "scout mode," wherein program code is executed during a stall condition to prefetch cache lines, but results are not committed to the architectural state of the processor. For a detailed description of operating in scout mode, see U.S. Pat. Pub. No. 2005/0223201, entitled "Generating Prefetches by Speculatively Executing Code Through Hardware Scout Threading," by inventors Shailender Chaudhry and Marc Tremblay, and filing date 19 Dec. 2003 (hereinafter "Chaudhry").

As described in Chaudhry, during scout mode, the processor can skip certain types of long-latency instructions, which means that the destination registers for these skipped instructions can contain invalid values. In order to prevent the invalid values from being used as inputs for subsequent instructions, the processor marks the registers as "not there" and does not use them as source registers for subsequent instructions. Similarly, if a branch instruction relies on a register or a condition code that is "not there," the branch instruction is predicted.

Some of these processors also support branch prediction, wherein a processor predicts the outcome of branch instructions to enable the fetch unit to fetch instructions following the branch instruction without being forced to wait for the branch instruction to execute. When the branch is subsequently executed (and resolved), the processor determines if the branch resolution was mispredicted. If so, the processor flushes any instructions which were incorrectly fetched because of the mispredicted branch and returns to the branch instruction to begin re-executing the program code using the correct branch resolution. Otherwise, if the branch was correctly predicted, the processor simply continues executing the program code.

Unfortunately, because a processor may not be able to resolve a branch instruction during scout mode, the processor may not determine that the branch was mispredicted. Consequently, the processor may continue incorrectly fetching instructions based on the misprediction, thereby causing the processor to perform useless computational work and generate unnecessary prefetches (i.e., prefetches that can evict useful cache lines, e.g., cache pollution).

SUMMARY

Embodiments of the present invention provide a system that executes program code in a processor. In some embodiments of the present invention, the system is computer system 100 (see FIG. 1) and the processor is processor 102. In these embodiments, the system starts by executing the program code in a normal mode using a primary strand while concurrently executing the program code ahead of the primary strand using a subordinate strand in a scout mode. Upon resolving a branch using the subordinate strand, the system records a resolution for the branch in a speculative branch resolution table. Upon subsequently encountering the branch using the primary strand, the system uses the recorded resolution from the speculative branch resolution table to predict a resolution for the branch for the primary strand. Upon determining that the resolution of the branch was mispredicted for the primary strand, the system determines that the subordinate strand mispredicted the branch and is incorrectly fetching instructions for execution following the misprediction. The system then recovers the subordinate strand to the branch and restarts the subordinate strand executing the program code from the branch in scout mode.

In some embodiments, when recovering the subordinate strand, the system: (1) halts executing program code in scout mode using the subordinate strand; (2) invalidates instructions fetched for execution by the subordinate strand following the mispredicted branch; (3) updates the speculative branch resolution table with the correct resolution for the branch; and (4) updates a state of the subordinate strand by copying a present state of the primary strand into the subordinate strand. When copying the present state of the primary strand into the subordinate strand, the system copies a program counter for the branch and other state information from the primary strand to the subordinate strand to enable the subordinate strand to restart execution from the branch in scout mode.

In some embodiments, upon encountering the branch using the subordinate strand in scout mode, if a previously recorded resolution of the branch is available, the system uses the recorded resolution to predict the resolution of the branch. Otherwise, the system guesses the resolution for the branch. The system then attempts to compute an actual resolution for the branch using the subordinate strand. Note that the system is unable to compute the actual resolution for the branch when a source register for the branch is "not there."

In some embodiments, upon computing the actual resolution for the branch using the subordinate strand, the system records the actual resolution in the speculative branch resolution table. Otherwise, the system records the predicted resolution or the guessed resolution in the speculative branch resolution table.

In some embodiments, upon determining that the branch was mispredicted for the primary strand, the system: (1) halts the primary strand; (2) invalidates instructions fetched for execution by the primary strand following the mispredicted branch; and (3) resumes executing program code from the branch using a correct branch resolution using the primary strand.

In some embodiments, when executing program code in the normal mode using the primary strand, the system commits results of executing instructions to an architectural state of the processor. When executing program code in the scout mode using the subordinate strand, the system prefetches cache lines and records branch resolutions, but does not commit results of executing instructions to the architectural state of the processor.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Terminology

The following description includes the terms "strand" and "thread." Although these terms are known in the art, the following definitions are provided to clarify the subsequent description.

The term "thread" refers to a "thread of execution," which is a software entity that can be run on hardware. For example, a computer program can be executed using one or more software threads.

A strand includes state information that is stored in hardware that is used to execute a thread. More specifically, a strand includes the software-visible architectural state of a thread, along with any other microarchitectural state required for the thread's execution. For example, a strand can include a program counter (PC), a next program counter (NPC), and one or more general-purpose registers, floating-point registers, condition-code registers, control/status registers, or state registers. Note that one or more strands can be used to execute program code for a thread.

In addition, the following description refers to branches or branch instructions. Generally, branch instructions are instructions that can cause processor 102 (see FIG. 1) to jump to a non-sequential location in program code to fetch the next instruction for execution. Branch instructions generally include a condition and a target for the branch. Upon executing the branch instruction, if the condition evaluates as "true," the branch is resolved as "taken" and processor 102 begins fetching instructions for execution from the target. On the other hand, if the condition in the branch instruction evaluates as "not true," the branch is resolved as "not taken" and processor 102 continues fetching the instructions following the branch instruction (i.e., from the incremented PC). For example, a BRANCH NOT EQUAL (BNE) instruction causes processor 102 to fetch the next instruction for execution from a specified target PC when a value in a processor register is not equal to the predetermined value. Branch instructions are well-known in the art and hence are not described in more detail.

Speculative Execution

Embodiments of the present invention support speculative execution, wherein processor 102 (see FIG. 1) executes program code without committing the results to the architectural state of processor 102 and/or computer system 100 (i.e., without making the results available to other strands, threads, processors, etc.). For example, embodiments of the present invention support scout mode, during which program code is executed to prefetch cache lines, but results are not committed to the architectural state of the processor. For a detailed explanation of scout mode, see U.S. Pat. Pub. No. 2005/0223201, entitled "Generating Prefetches by Speculatively Executing Code Through Hardware Scout Threading," by inventors Shailender Chaudhry and Marc Tremblay, and filing date 19 Dec. 2003, hereinafter "Chaudhry."

As described in Chaudhry, embodiments of the present invention can skip certain instructions during scout mode. For example, these embodiments can skip instructions with unresolved dependencies, floating-point instructions, and/or other long-latency instructions. When an instruction is skipped during scout mode, the instruction does not execute and the destination register for the instruction is marked as invalid (or "not there"). Subsequent dependent instructions cannot use the not-there register as a source register. Moreover, any instruction that has a dependency on a long-latency instruction is skipped, and its destination register(s), if any, are also marked as "not there."

Some embodiments of the present invention support other speculative execution modes, such as "execute-ahead mode." For a detailed explanation of execute-ahead mode, see U.S. Pat. No. 7,114,060, entitled "Selectively Deferring Instructions Issued in Program Order Utilizing a Checkpoint and Multiple Deferral Scheme," by inventors Shailender Chaudhry and Marc Tremblay, and filing date 14 Oct. 2003. In addition, embodiments of the present invention support a normal-execution mode, wherein architectural results are committed to the architectural state of processor 102 and/or computer system 100 and are hence available to other strands, threads, or processors.

Simultaneous Speculative Threading

In embodiments of the present invention, processor 102 (see FIG. 1) supports simultaneous speculative threading (SST), wherein processor 102 uses two or more strands together to execute a single software thread. For example, these embodiments can use a "primary strand" and a "subordinate strand" to execute the thread.

In embodiments of the present invention, processor 102 uses the primary strand to execute instructions from program code in a normal-execution mode, while using the subordinate strand to execute instructions from program code in scout mode. Because executing program code in scout mode is generally faster, the subordinate strand typically executes program code ahead of the primary strand. Thus, the subordinate strand can generate prefetches for cache lines and record branch resolutions that are subsequently used by the primary strand in normal-execution mode. In comparison to existing systems, these embodiments can execute the program code using the primary strand more efficiently because the subordinate strand has resolved branches and prefetched cache lines.

Note that the subordinate strand may not always be far enough ahead of the primary strand to prefetch cache lines or resolve branches in time for the primary strand to use them (e.g., immediately after startup, upon recovering from traps, etc.). However, because the subordinate strand is generally faster in scout mode, the subordinate strand can develop a sufficient lead over the primary strand to enable the prefetches to be useful for the primary strand. Some embodiments of the present invention include one or more mechanisms to prevent the subordinate strand from getting too far ahead of the primary strand (so that correctly prefetched cache lines are not evicted by subsequent instructions and branch resolutions are not incorrectly updated).

In addition, note that the designations "primary strand" and "subordinate strand" used in this description do not indicate a particular strand (i.e., any strand can function as a primary strand or a subordinate strand). In some embodiments, a strand can be switched between being a primary strand and a subordinate strand as processor 102 operates. Moreover, although we describe embodiments of the present invention that use two strands to execute one thread, alternative embodiments can use more than two strands. For example, some embodiments can use two or more strands together which collectively function as the primary strand or the subordinate strand.

Computer System

Figure 1:
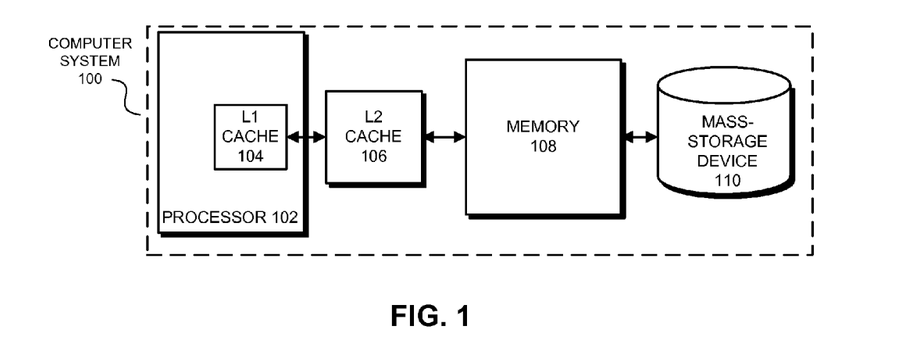
FIG. 1 presents a block diagram of a computer system in accordance with embodiments of the present invention.

FIG. 1 presents a block diagram of a computer system 100 in accordance with embodiments of the present invention. Computer system 100 includes processor 102, L2 cache 106, memory 108, and mass-storage device 110.

Processor 102 can be a general-purpose, multi-stranded processor that performs computational operations. For example, processor 102 can be a central processing unit (CPU), such as a microprocessor. Alternatively, processor 102 can be a controller or an application-specific integrated circuit. Recall that processor 102 supports SST, meaning that two or more strands can be used to execute a thread. In some embodiments of the present invention, a subordinate strand executes program code ahead of a primary strand to prefetch cache lines and compute branch resolutions that are then used by the primary strand.

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile storage device, such as a disk drive or a large flash memory, with a large access time, while L1 cache 104, L2 cache 106, and memory 108 are smaller, faster semiconductor memories that store copies of frequently used data. Memory 108 can be a dynamic random access memory (DRAM) structure that is larger than L1 cache 104 and L2 cache 106, whereas L1 cache 104 and L2 cache 106 can be comprised of smaller static random access memories (SRAM). Such memory structures are well-known in the art and are therefore not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (e.g., a "smart phone"), a guidance system, a toy, a control system (e.g., an automotive control system), or another electronic device.

Although we describe computer system 100 as comprising specific components, in alternative embodiments different components can be present in computer system 100. For example, in some embodiments, computer system 100 can include video cards, network cards, optical drives, and/or other peripheral devices that are coupled to processor 102 using a bus, a network, or another suitable communication channel. In some embodiments, computer system 100 may include one or more additional processors, wherein the processors share some or all of L2 cache 106, memory 108, and mass-storage device 110. In some embodiments, computer system 100 may not include some of the memory hierarchy (i.e., L2 cache 106, memory 108, and/or mass-storage device 110).

Processor

Figure 2:
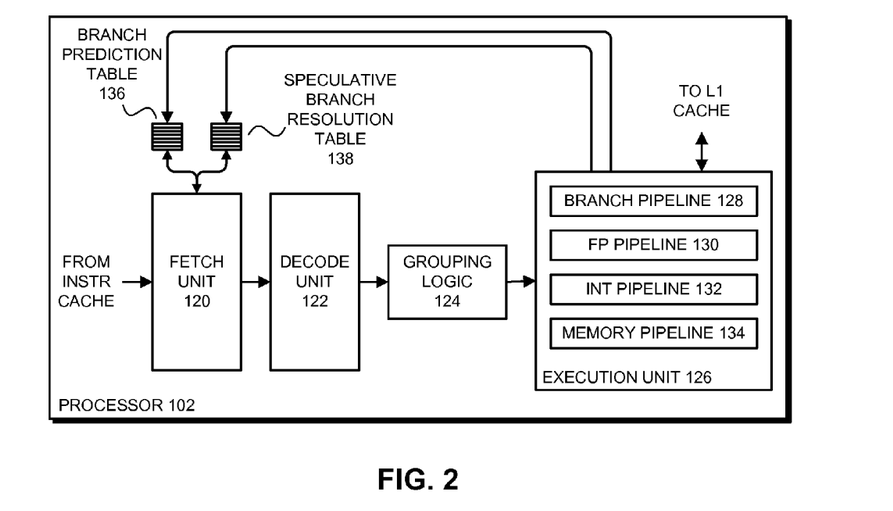
FIG. 2 presents a block diagram of a processor in accordance with embodiments of the present invention.

FIG. 2 presents a block diagram of processor 102 in accordance with embodiments of the present invention. As shown in FIG. 2, processor 102 includes fetch unit 120, decode unit 122, grouping logic 124, and execution unit 126. Execution unit 126 includes branch pipeline 128, floating point (FP) pipeline 130, integer (INT) pipeline 132, and memory pipeline 134.

Fetch unit 120 fetches instructions from an instruction cache (e.g., L1 cache 104) for execution. Decode unit 122 decodes the fetched instructions and prepares the instructions for execution in execution unit 126. Grouping logic 124 groups decoded instructions for execution and forwards the instruction to the appropriate pipeline in execution unit 126. Within execution unit 126, branch pipeline 128 executes branch instructions (e.g., computing addresses for branches), floating point pipeline 130 executes floating-point operations, integer pipeline 132 executes integer operations, and memory pipeline 134 executes memory operations (e.g., completing loads and stores). The functions of the above-mentioned units and the pipelines in processor 102 are known in the art and hence are not described in more detail.

Figure 3:
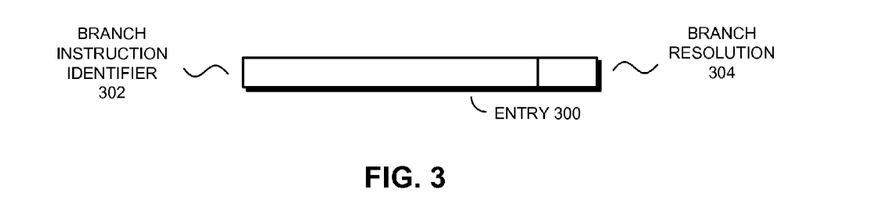
FIG. 3 presents an exemplary entry in a branch prediction table or a speculative branch resolution table in accordance with embodiments of the present invention.

Processor 102 also includes branch prediction table 136 and speculative branch resolution table 138. Each of the tables includes a set of entries that processor 102 uses to keep track of branch resolutions. FIG. 3 presents an exemplary branch prediction table or speculative branch resolution table entry 300 in accordance with embodiments of the present invention. As shown in FIG. 3, each entry 300 includes a branch instruction identifier 302, which can be the address in memory of the branch or another value that identifies the branch. In addition, each entry includes a branch resolution 304, which is used to record the "taken" or "not taken" resolution of the branch. In some embodiments of the present invention, entry 300 includes one or more additional fields (not shown), such as a target address for the last resolution of the branch and/or other branch information. In some embodiments of the present invention, branch prediction table 136 and speculative branch resolution table 138 are separate hardware structures in processor 102. Branch prediction tables 136 and speculative branch resolution table 138 is described in more detail below.

In embodiments of the present invention, processor 102 also includes one or more mechanisms for quickly copying some or all of the architectural state of a given strand to another strand (not shown). In some embodiments, the mechanisms enable the copying of the architectural state of one strand to the other in such a way that the operation of the strand being copied from is not interrupted. For example, in some embodiments, processor 102 can include one or more additional copies of some or all of the hardware structures in a given strand (shadow copies), which can be used when copying the architectural state of the strand.

When copying the architectural state from a given strand to another, these mechanisms perform a consistent copy (i.e., the copy does not copy partially modified architectural state information). We use the term "instantly copy" herein to indicate copy operations that make such a consistent copy of the architectural state.

Note that processor 102 is an exemplary processor for the purposes of illustration. In alternative embodiments, processor 102 contains other stages (units) and/or circuits. The stages and/or circuits that can be included in processor 102 are known in the art and hence are not described in more detail.

Branch Predictions

Generally, processor 102 fetches branch instructions for execution in fetch unit 120, but does not compute resolutions for the branch instructions until the branch instructions are executed in branch pipeline 128. Hence, between fetching a branch instruction and executing the branch instruction, processor 102 has no actual resolution for the branch instruction. Because the actual resolution of the branch instruction is unknown, without additional mechanisms, processor 102 could not determine which instructions to fetch following a branch instruction.

In order to enable processor 102 to fetch instructions following branch instructions before the branch instructions are resolved, processor 102 includes branch prediction table 136 and speculative branch resolution table 138 for making branch predictions. Processor 102 uses branch prediction table 136 to keep records of prior resolutions for branches executed by the primary strand during normal-execution mode and uses speculative branch resolution table 138 to keep records of the most recent resolution for branch instructions executed by the subordinate strand during scout mode. Upon encountering a branch instruction, processor 102 uses a branch resolution stored in the appropriate table to predict the resolution for the branch instruction and fetches subsequent instructions based on the predicted resolution.

Note that the information in speculative branch resolution table 138 differs from the information in branch prediction table 136 because speculative branch resolution table 138 contains records of an actual resolution for the same instance of the branch instruction. More specifically, as described above, the subordinate strand executes program code in scout mode ahead of the primary strand, which means that a particular instance of a branch instruction can be executed (and resolved) by the subordinate strand ahead of the primary strand. Processor 102 records the resolution for the branch instruction computed using the subordinate strand in scout mode in speculative branch resolution table 138 and subsequently uses the resolution when making a prediction for the primary strand. In contrast, branch prediction table 136 includes information about the resolution of the branch the last time the branch instruction was executed using the primary strand in normal execution mode.

Note also that branch instructions can be encountered for which there is no prediction available (e.g., when a branch instruction is executed for the first time). Thus, in order to enable instructions following branch instructions to be fetched, embodiments of the present invention "guess" the resolution of branches for which there are no predictions available. In some embodiments of the present invention, guesses can be based on available information, such as the resolutions of other branches, conditions within processor 102, or other instructions or patterns of instructions in program code. In alternative embodiments, guesses can be arbitrary.

In embodiments of the present invention, during scout mode, if a branch instruction's source register is "not there," the branch instruction predicted. Consequently, the actual resolution for the branch instruction is not determined during scout mode, and the subordinate strand continues fetching instructions following the predicted (or guessed) resolution for the branch instruction. In this case, the predicted or guessed resolution is recorded in speculative branch resolution table 138. Note that this can mean that speculative branch resolution table 138 can include branch "resolutions" that are based only on a prediction or a guess (and have not been computed in branch pipeline 128).

Branch Predictions Using the Branch Prediction Table and Speculative Branch Resolution Table Generally, when making a branch prediction, processor 102 reads the branch resolution from an appropriate table entry and uses the resolution to predict the resolution of the branch instruction. For example, if an entry in speculative branch resolution table 138 shows a given branch was "taken" when the branch instruction was executed using the subordinate strand in scout mode, processor 102 predicts that a subsequent execution of the branch instruction using the primary strand will also resolve as "taken."

In embodiments of the present invention, processor 102 can use speculative branch resolution table 138 to make branch predictions for either the primary strand in normal-execution mode or for the subordinate strand in scout mode. More specifically, upon encountering a branch instruction using either the subordinate strand or the primary strand, processor 102 can predict the resolution of the branch instruction using a resolution contained in a corresponding entry in branch prediction table 136.

In embodiments of the present invention, processor 102 can also use branch prediction table 136 to make branch predictions for either the primary strand in normal-execution mode or for the subordinate strand in scout mode. More specifically, upon encountering a branch instruction using either the subordinate strand or the primary strand, processor 102 can predict the resolution of the branch instruction using a resolution contained in a corresponding entry in branch prediction table 136.

Note that in some embodiments of the present invention, processor 102 preferentially uses entries in speculative branch resolution table 138 instead of entries in branch prediction table 136 for either the primary strand in normal-execution mode or for the subordinate strand in scout mode (i.e., when an entry is available in speculative branch resolution table 138, processor 102 preferentially uses that entry to make the branch prediction).

Branch Mispredictions

While executing branch instructions using either the primary strand or the subordinate strand, processor 102 monitors the branch instructions to determine if a resolution that was predicted for the strand turns out to be incorrect (i.e., to differ from the branch resolution computed in branch pipeline 128). If a branch is mispredicted, the strand has fetched incorrect instructions following the branch instruction. Therefore, upon detecting a mispredicted branch, processor 102: (1) halts executing instructions using the strand; (2) flushes instructions that were fetched based on the misprediction; (3) updates the PC for the strand to indicate the branch instruction; and (4) resumes using the strand to execute instructions from the branch instruction. (Note that this general process for handling branch mispredictions applies to both the primary strand in normal-execution mode and the subordinate strand in scout mode.)

When flushing the instructions, processor 102 can invalidate instructions that were fetched based on the mispredicted branch, thereby preventing these instructions from affecting the architectural state of processor 102. For example, processor 102 can invalidate instructions in fetch unit 120, decode unit 122, grouping logic 124, and execution unit 126 (including invalidating instructions in pipelines 128-134).

Along with performing the above-described operations, processor 102 also updates the branch prediction mechanisms to avoid a second branch misprediction. More specifically, in normal-execution mode, processor 102 can invalidate any entry for the branch in speculative branch resolution table 138 and can update an entry in branch prediction table 136 with the correct resolution of the branch instruction. In scout mode, processor 102 can update the branch's entry in speculative branch resolution table 138. In some embodiments, in scout mode, processor 102 also updates the corresponding entry in branch prediction table 136.

Processor 102 can then use branch prediction table 136 and speculative branch resolution table 138 to generate subsequent branch predictions as described above.

Recovering the Subordinate Strand

As described above, in embodiments of the present invention, the subordinate strand uses a predicted or guessed resolution to fetch subsequent instructions for branch instructions for which the source register is "not there." Processor 102 then records the predicted or guessed resolution in speculative branch resolution table 138 for the branch instruction. Processor 102 can then use the resolution recorded by the subordinate strand to predict a branch resolution for the branch instruction for the primary strand.

In embodiments of the present invention, processor 102 monitors branch instructions being executed by the primary strand for which an entry in speculative branch resolution table 138 was used to make a branch prediction. If such a branch instruction is discovered to be mispredicted, processor 102 determines that the entry in speculative branch resolution table 138 that was used to make the branch prediction is incorrect. Because the entry in speculative branch resolution table 138 is incorrect, processor 102 also determines that the subordinate strand mispredicted the branch and is incorrectly fetching instructions for execution following the branch instruction (and can therefore be generating incorrect prefetches and performing needless computational work).

In embodiments of the present invention, upon determining that the resolution in speculative branch resolution table 138 is incorrect, processor 102 recovers the subordinate strand from the mispredicted branch. (Note that processor 102 also recovers the primary strand using the above-described operations.)

When recovering the subordinate strand, processor 102 restarts execution for the subordinate strand from the branch instruction for which the entry in speculative branch resolution table 138 was determined to be incorrect. More specifically, processor 102: (1) halts executing instructions using the subordinate strand; (2) copies the present state of the primary strand into the subordinate strand; and (3) restarts executing instructions using the subordinate strand. In some embodiments, copying the present state of the primary strand can involve copying the architectural state of the primary strand (i.e., the primary strand's register file, PC/NPC, etc.) into the architectural state of the subordinate strand.

In order to enable the state of the primary strand to be copied to the subordinate strand, processor 102 uses one or more mechanisms to preserve the state at the time that the branch instruction was issued by the primary strand. For example, processor 102 can include mechanisms for tracking the PC/NPC of a branch instruction so that when the branch instruction is determined to be mispredicted (i.e., in branch pipeline 128), the PC/NPC is available for copying. Preserving the state of a strand to enable recovery from branch mispredictions is known in the art and hence is not described in more detail.

Embodiments of the present invention enable processor 102 to recover the subordinate strand from a branch misprediction. In some embodiments, processor 102 can detect branch mispredictions that may have gone uncorrected in existing systems. More specifically, embodiments of the present invention enable the detection of the case where the branch was incorrectly predicted or guessed for the subordinate strand and a source register is "not there," meaning that the resolution of the branch instruction was never computed.

Process for Handling Branch Instructions

Figure 4A:
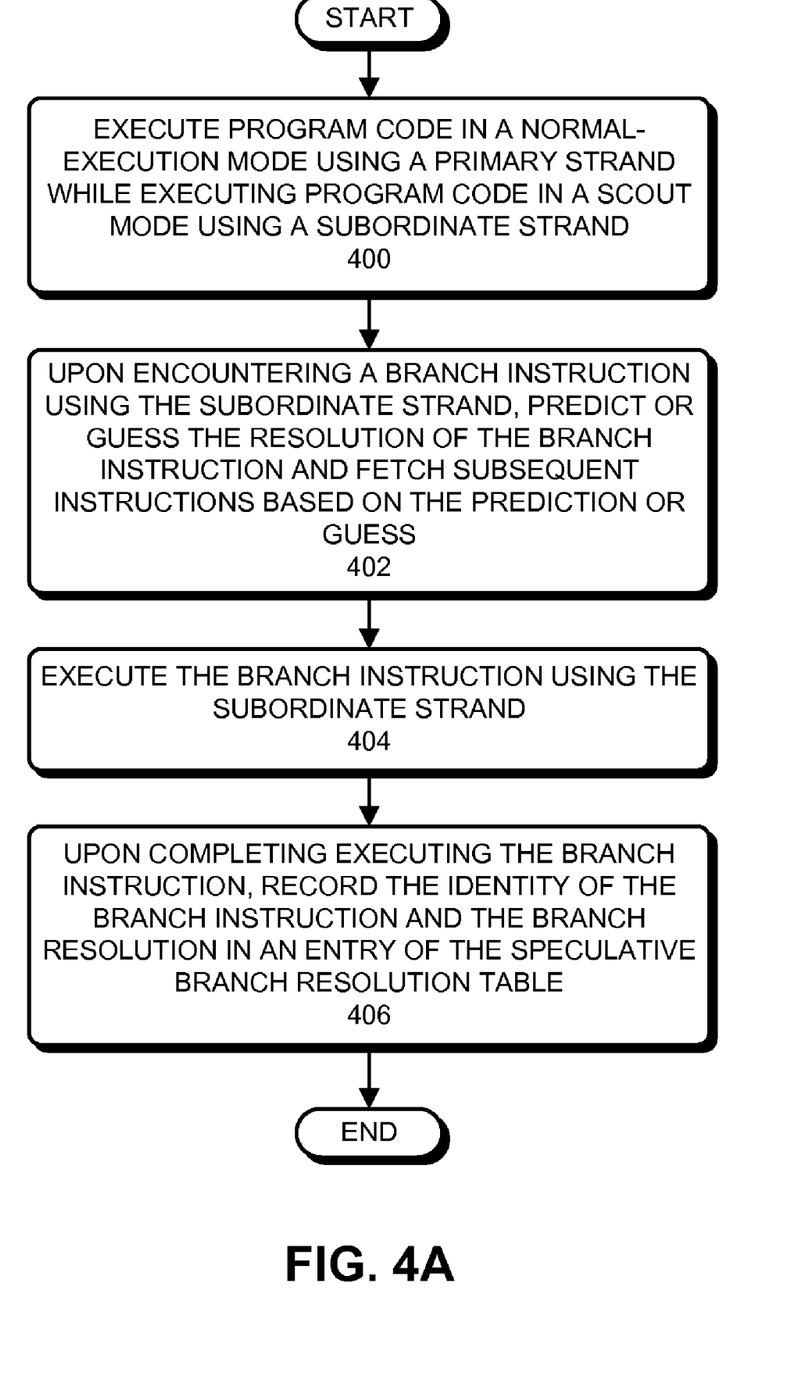
FIG. 4A illustrates a process for recording branch resolutions computed by the subordinate strand during scout mode in accordance with embodiments of the present invention.
Figure 4B:
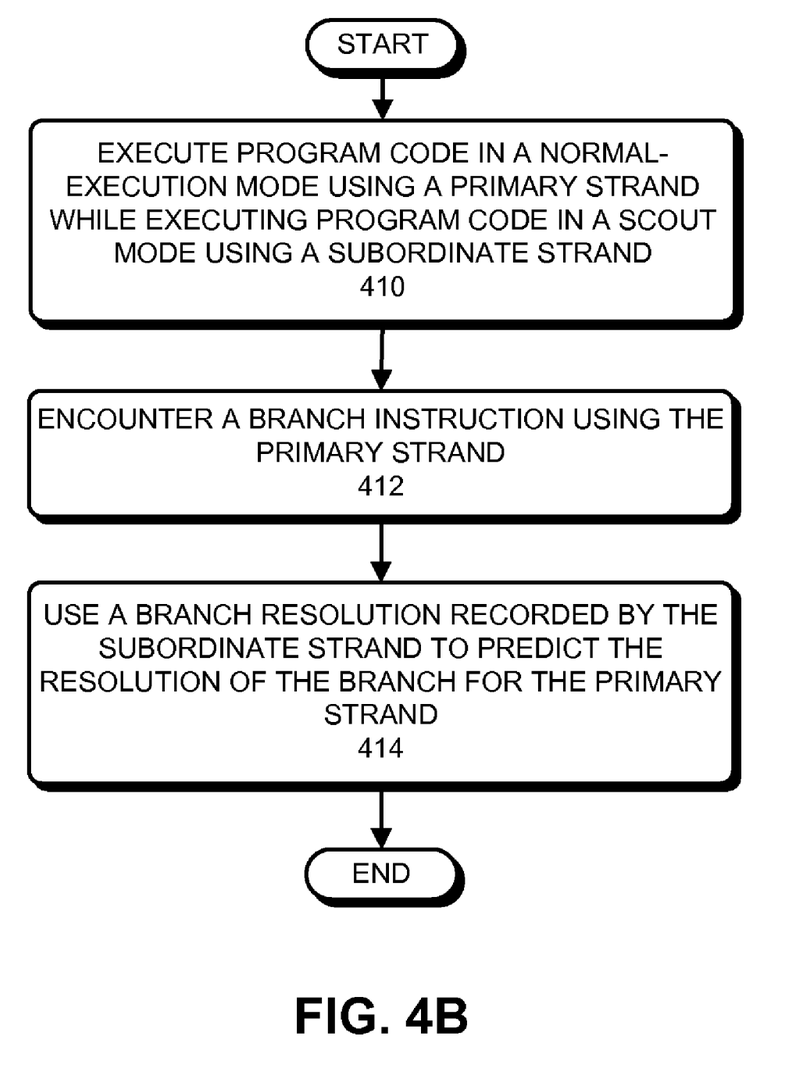
FIG. 4B illustrates a process for using branch resolutions recorded by the subordinate strand to make branch predictions for the primary strand in accordance with embodiments of the present invention.
Figure 4C:
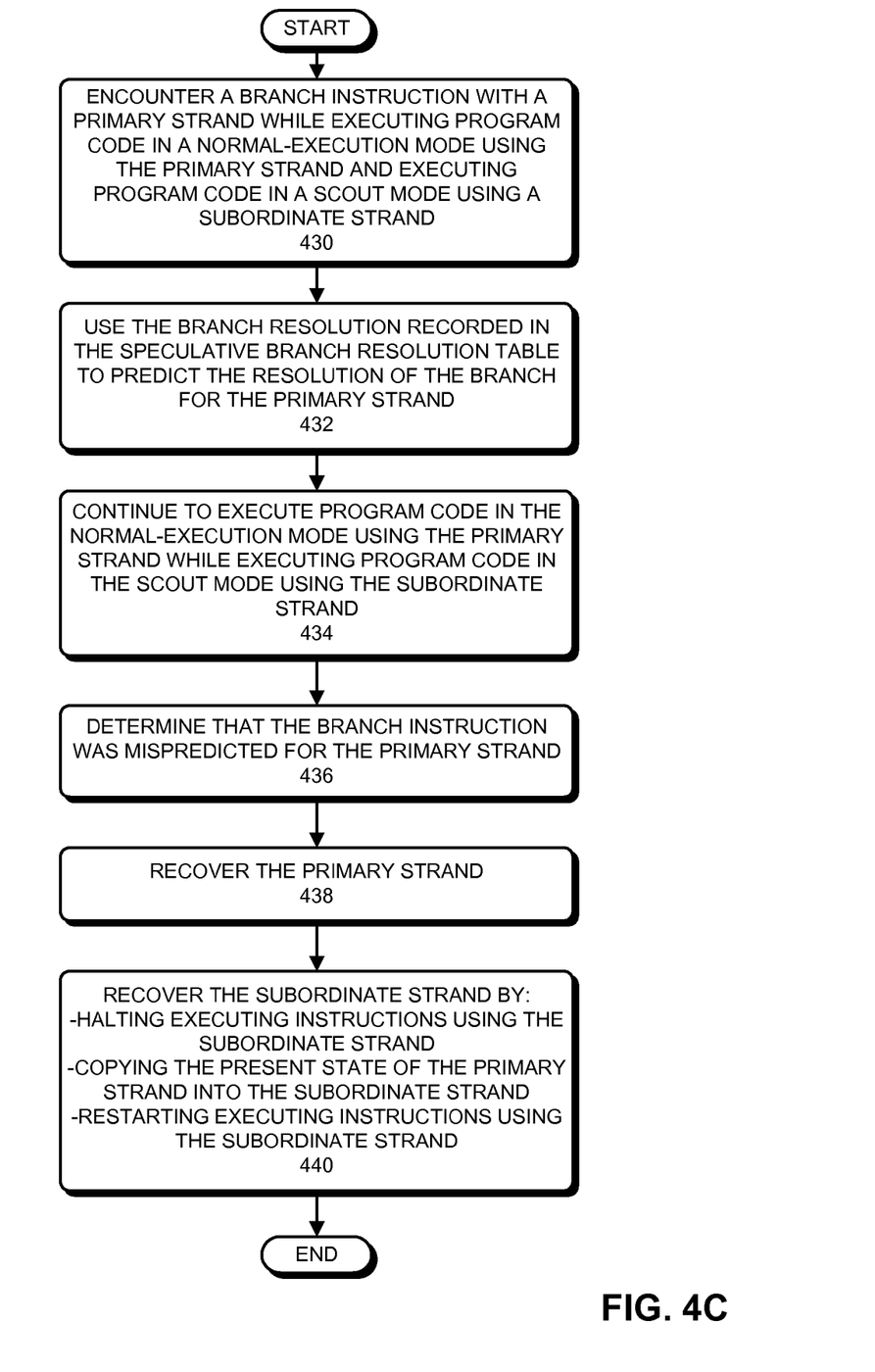
FIG. 4C illustrates a process for recovering the subordinate strand upon determining that a branch instruction has been mispredicted for the primary strand in accordance with embodiments of the present invention.

FIGS. 4A-4C present flowcharts illustrating processes for handling branch instructions in accordance with embodiments of the present invention. More specifically, FIG. 4A illustrates a process for recording branch resolutions computed by the subordinate strand during scout mode in accordance with embodiments of the present invention; FIG. 4B illustrates a process for using the branch resolutions recorded by the subordinate strand to make branch predictions for the primary strand in accordance with embodiments of the present invention; and FIG. 4C illustrates a process for recovering the subordinate strand upon determining that a branch instruction has been mispredicted for the primary strand in accordance with embodiments of the present invention.

The process illustrated in FIG. 4A starts with processor 102 executing program code in a normal-execution mode using a primary strand while executing program code in a scout mode using a subordinate strand (step 400).

Upon encountering a branch instruction using the subordinate strand, processor 102 predicts or "guesses" the resolution of the branch instruction and fetches subsequent instructions based on the prediction or guess (step 402). Recall that processor 102 uses an entry in speculative branch resolution table 138 or an entry branch prediction table 136 to predict the branch when one is available. If neither table contains an entry for the branch, processor 102 guesses a resolution.

Processor 102 then executes the branch instruction using the subordinate strand (step 404). Recall that processor 102 can predict the branch instruction if a source register for the branch instruction is "not there," and the actual resolution of the branch instruction may never be computed.

Upon completing executing (i.e., executing or predicting) the branch instruction, processor 102 records the identity of the branch instruction and the branch resolution in an entry of speculative branch resolution table 138 (step 406). When recording the identity of the branch instruction, processor 102 records information about the branch instruction such as the address in memory where the branch instruction is located. When recording the branch resolution, processor 102 records the actual branch resolution computed by the subordinate strand (if it can be determined), but otherwise records the guess as the resolution for the branch.

FIG. 4B illustrates a process for using the branch resolutions recorded during scout mode to make branch predictions for the primary strand during normal-execution mode in accordance with embodiments of the present invention. Recall that the subordinate strand typically executes faster than the primary strand and thus executes instructions, including branch instructions, ahead of the primary strand. Thus, we assume for the purposes of illustration that the subordinate strand has already completed executing a given branch and recorded a resolution for the branch (as described with respect to FIG. 4A).

The process illustrated in FIG. 4B starts with processor 102 executing program code in a normal-execution mode using a primary strand while executing program code in a scout mode using a subordinate strand (step 410). Processor 102 next encounters a branch instruction using the primary strand (step 412). Processor 102 then uses the branch resolution recorded in speculative branch resolution table 138 to predict the resolution of the branch for the primary strand (step 414). In these embodiments, because the subordinate strand can compute actual resolutions for branches encountered in scout mode, processor 102 can use actual resolutions as branch predictions, which can be more accurate than using prior branch resolutions (i.e., from branch prediction table 136) to predict the resolution of branches.

FIG. 4C illustrates a process for recovering ("steering") the subordinate strand upon determining that a branch instruction has been mispredicted for the primary strand in accordance with embodiments of the present invention. We again assume for the purposes of illustration that the subordinate strand has already completed executing the branch and recorded a resolution for the branch in speculative branch resolution table 138 (as described with respect to FIG. 4A).

The process starts with processor 102 encountering a branch instruction with a primary strand while executing program code in a normal-execution mode using the primary strand and executing program code in a scout mode using a subordinate strand (step 430). Processor 102 then uses the branch resolution recorded in speculative branch resolution table 138 to predict the resolution of the branch for the primary strand (step 432).

Processor 102 next continues to execute program code in the normal-execution mode using the primary strand while executing program code in the scout mode using the subordinate strand (step 434). When continuing to execute program code in the normal-execution mode using the primary strand, processor 102 fetches instructions following the branch instruction based on the predicted resolution.

Processor 102 then determines that the branch instruction was mispredicted (step 436) and recovers the primary strand from the branch misprediction (step 438). Recall that detecting a misprediction in the primary strand for a branch instruction for which the resolution was predicted using an entry in speculative branch resolution table 138 enables processor 102 to determine that the entry in speculative branch resolution table 138 is incorrect and hence the subordinate strand is fetching the incorrect instructions following the branch instruction. Processor 102 can then recover the subordinate strand by: (1) halting executing instructions using the subordinate strand; (2) copying the present state of the primary strand into the subordinate strand; and (3) restarting executing instructions using the primary strand (step 440). Processor 102 can also optionally delete or update the entry from speculative branch resolution table 138.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing program code in a processor, comprising:
   executing the program code in a normal mode using a primary strand;
   concurrently executing the program code ahead of the primary strand using a subordinate strand in a scout mode;
   upon resolving a branch using the subordinate strand, recording a resolution for the branch in a speculative branch resolution table;
   upon subsequently encountering the branch using the primary strand, using the recorded resolution from the speculative branch resolution table to predict a resolution for the branch for the primary strand; and
   upon determining that the resolution of the branch was mispredicted for the primary strand,
      determining that the subordinate strand mispredicted the branch and is incorrectly fetching instructions for execution following the misprediction; and
      recovering the subordinate strand to the branch and restarting the subordinate strand executing the program code from the branch in scout mode.

2. The method of claim 1, wherein recovering the subordinate strand involves:
   halting executing program code in scout mode using the subordinate strand;
   invalidating instructions fetched for execution by the subordinate strand following the mispredicted branch;
   updating the speculative branch resolution table with the correct resolution for the branch; and
   updating a state of the subordinate strand by copying a present state of the primary strand into the subordinate strand, which involves copying a program counter for the branch and other state information from the primary strand to the subordinate strand to enable the subordinate strand to restart execution from the branch in scout mode.

3. The method of claim 2, wherein resolving the branch using the subordinate strand during scout mode involves:
   upon encountering the branch using the subordinate strand, if a previously recorded resolution of the branch is available, using the recorded resolution to predict the resolution of the branch;
   otherwise, guessing the resolution for the branch; and
   subsequently attempting to compute an actual resolution for the branch using the subordinate strand, wherein the actual resolution cannot be computed for the branch when a source register for the branch is "not there."

4. The method of claim 3, wherein recording the resolution for the branch involves:
   upon computing the actual resolution for the branch using the subordinate strand, recording the actual resolution in the speculative branch resolution table; and
   otherwise, recording the predicted resolution or the guessed resolution in the speculative branch resolution table.

5. The method of claim 1, wherein upon determining that the branch was mispredicted for the primary strand, the method further comprises:
   halting the primary strand;
   invalidating instructions fetched for execution by the primary strand following the mispredicted branch; and
   resuming executing program code from the branch using a correct branch resolution using the primary strand.

6. The method of claim 1, wherein executing program code in the normal mode using the primary strand involves committing results of executing instructions to an architectural state of the processor; and
   executing program code in the scout mode using the subordinate strand involves prefetching cache lines and recording branch resolutions, but not committing results of executing instructions to the architectural state of the processor.

7. An apparatus for executing program code, comprising:
   a processor; and
   a speculative branch resolution table in the processor;

wherein the processor is configured to execute the program code in a normal mode using a primary strand while concurrently executing the program code ahead of the primary strand using a subordinate strand in a scout mode;

upon resolving a branch using the subordinate strand, the processor is configured to record a resolution for the branch in the speculative branch resolution table;

upon subsequently encountering the branch using the primary strand, the processor is configured to use the recorded resolution from the speculative branch resolution table to predict a resolution for the branch for the primary strand; and upon determining that the resolution of the branch was mispredicted for the primary strand, the processor is configured to:
   determine that the branch was mispredicted for the subordinate strand and instructions are being incorrectly fetched for execution for the subordinate strand following the misprediction; and
   recover the subordinate strand to the branch and restart the subordinate strand executing the program code from the branch in scout mode.

8. The apparatus of claim 7, wherein when recovering the subordinate strand, the processor is configured to:
   halt executing program code in scout mode using the subordinate strand;
   invalidate instructions fetched for execution by the subordinate strand following the mispredicted branch;
   update the speculative branch resolution table with the correct resolution for the branch; and
   update a state of the subordinate strand by copying a present state of the primary strand into the subordinate strand.

9. The apparatus of claim 8, wherein when copying the present state of the primary strand into the subordinate strand, the processor is configured to instantaneously copy a program counter for the branch and other state information from the primary strand to the subordinate strand to enable the subordinate strand to restart execution from the branch in scout mode.

10. The apparatus of claim 8, wherein upon encountering the branch using the subordinate strand in scout mode, the processor is configured to:
   if a recorded resolution is available, use the recorded resolution to predict the resolution of the branch;
   otherwise, guess the resolution for the branch; and
   subsequently attempt to compute an actual resolution for the branch using the subordinate strand, wherein the processor is unable to compute the actual resolution for the branch when a source register for the branch is "not there."

11. The apparatus of claim 10, wherein the processor is configured to:
   upon computing the actual resolution for the branch using the subordinate strand, record the actual resolution in the speculative branch resolution table; and
   otherwise, record the predicted resolution or the guessed resolution in the speculative branch resolution table.

12. The apparatus of claim 7, wherein upon determining that the branch was mispredicted for the primary strand, the processor is configured to:
   halt the primary strand;
   invalidate instructions fetched for execution by the primary strand following the mispredicted branch; and
   resume executing program code from the branch using a correct branch resolution using the primary strand.

13. The apparatus of claim 7, wherein the apparatus further comprises:
   a branch prediction table in the processor;
   wherein upon resolving a branch using the primary strand in a normal-execution mode, the processor is configured to record the resolution in the branch prediction table;
   wherein the processor is further configured to use available recorded resolutions from the branch prediction table to predict the resolution of branches when the speculative branch resolution table does not contain resolutions for the branches.

14. A computer system for executing program code, comprising:
   a processor;
   a memory coupled to the processor, wherein the memory stores data and instructions for the processor; and
   a speculative branch resolution table in the processor;
   wherein the processor is configured to execute the program code in a normal mode using a primary strand while concurrently executing the program code ahead of the primary strand using a subordinate strand in a scout mode;
   upon resolving a branch using the subordinate strand, the processor is configured to record a resolution for the branch in the speculative branch resolution table;
   upon subsequently encountering the branch using the primary strand, the processor is configured to use the recorded resolution from the speculative branch resolution table to predict a resolution for the branch for the primary strand; and
   upon determining that the resolution of the branch was mispredicted for the primary strand, the processor is configured to:
      determine that the branch was mispredicted for the subordinate strand and instructions are being incorrectly fetched for execution for the subordinate strand following the misprediction; and
      recover the subordinate strand to the branch and restart the subordinate strand executing the program code from the branch in scout mode.

15. The computer system of claim 14, wherein when recovering the subordinate strand, the processor is configured to:
   halt executing program code in scout mode using the subordinate strand;
   invalidate instructions fetched for execution by the subordinate strand following the mispredicted branch;
   update the speculative branch resolution table with the correct resolution for the branch; and
   update a state of the subordinate strand by copying a present state of the primary strand into the subordinate strand.

16. The computer system of claim 15, wherein when copying the present state of the primary strand into the subordinate strand, the processor is configured to instantaneously copy a program counter for the branch and other state information from the primary strand to the subordinate strand to enable the subordinate strand to restart execution from the branch in scout mode.

17. The computer system of claim 15, wherein upon encountering the branch using the subordinate strand in scout mode, the processor is configured to:
   if a recorded resolution is available, use the recorded resolution to predict the resolution of the branch;
   otherwise, guess the resolution for the branch; and
   subsequently attempt to compute an actual resolution for the branch using the subordinate strand, wherein the processor is unable to compute the actual resolution for the branch when a source register for the branch is "not there."

18. The computer system of claim 17, wherein the processor is configured to:
upon computing the actual resolution for the branch using the subordinate strand, record the actual resolution in the speculative branch resolution table; and
otherwise, record the predicted resolution or the guessed resolution in the speculative branch resolution table.

19. The computer system of claim 14, wherein upon determining that the branch was mispredicted for the primary strand, the processor is configured to:
halt the primary strand;
invalidate instructions fetched for execution by the primary strand following the mispredicted branch; and
resume executing program code from the branch using a correct branch resolution using the primary strand.

20. The computer system of claim 14, wherein the computer system further comprises:
a branch prediction table in the processor;
wherein upon resolving a branch using the primary strand in a normal-execution mode, the processor is configured to record the resolution in the branch prediction table;
wherein the processor is further configured to use available recorded resolutions from the branch prediction table to predict the resolution of branches when the speculative branch resolution table does not contain resolutions for the branches.

* * * * *